United States Patent [19]
Yabuta

[11] 3,771,835
[45] Nov. 13, 1973

[54] VEHICULAR HYDRAULIC BRAKE SYSTEM

[75] Inventor: Keiichiro Yabuta, Yokohama, Japan

[73] Assignee: Nissan Motor Company, Limited, Kanagawa-ku, Yokohama, Japan

[22] Filed: Mar. 15, 1972

[21] Appl. No.: 234,834

Related U.S. Application Data

[62] Division of Ser. No. 12,280, Feb. 18, 1970, Pat. No. 3,663,067.

[52] U.S. Cl............................. 303/6 C, 60/54.5 E
[51] Int. Cl............................................ B60t 13/10
[58] Field of Search.................... 303/6 C, 84 A, 24; 188/349; 60/54.5 E

[56] References Cited
UNITED STATES PATENTS

| | | | |
|---|---|---|---|
| 3,385,308 | 5/1968 | Farr | 303/6 C X |
| 3,448,230 | 6/1969 | Bueler | 303/6 C X |
| 3,455,609 | 7/1969 | Bratten | 303/6 C X |

*Primary Examiner*—Milton Buchler
*Assistant Examiner*—D. C. Butler
*Attorney*—McCarthy, Depaoli, O'Brien & Price

[57] ABSTRACT

A vehicular hydraulic brake system of tandem type having front and rear sections connected, for instance, to the front and rear brake units through independent fluid circuits, which system has a fluid pressure modulator valve constructed to transmit an unmodulated fluid pressure to the brake cylinders when the deceleration is lower than a predetermined level and to transmit a modulated fluid pressure to the rear brake cylinders when the deceleration exceeds the predetermined level, the modulated pressure being proportional to the input pressure from the rear brake master cylinder. In the event a failure takes place in the front brake fluid circuit, the valve transmits to the rear brake cylinders either an unmodulated fluid pressure when the deceleration exceeds the predetermined level.

2 Claims, 3 Drawing Figures

VEHICULAR HYDRAULIC BRAKE SYSTEM

The present application is a division of my earlier filed pending application, Ser. No. 12,280, filed Feb. 18, 1970 now U.S. Pat. 3,663,067.

The invention relates to a vehicular hydralic brake system and, more particularly, to a brake system of tandem type having at least two split master cylinders connected through independent fluid circuits with brake cylinders of the wheel brake units.

It is sometimes experienced in driving a motor vehicle with a simple hydraulic brake system that failure of one component of the brake system makes the brakes inoperable. To reduce the risk of this occurring, it is proposed and put into practice to have the brake system divided into at least two independent fluid circuits, so that even in the event one circuit fails the other circuits are still left intact. The brake system having such two or more independent fluid circuits is called the split hydraulic brake system and a series of split master cylinders incorporated therein are called the tandem master cylinder or fluid motor. Where the brake system is divided into two independent fluid circuits with two associated master cylinders as is usually the case, one is connected with the front brakes and the other with the rears so that if the front brake circuit, for instance, fails the driver is still left with the rear brake circuit operable.

It is, apart from this, also encountered in driving a motor vehicle that the rear wheels are locked when the brake pedal is depressed hard so that the tires are skidded and the vehicle spinned. This is due to the fact that the weight transfer from the rear wheels increases with increasing deceleration. It is thus required to reduce the proportion of the braking effort exercised by the rear brakes as the deceleration increases. The braking effort is determined by the fluid pressure in the fluid lines to the brake cylinders and, for the purpose of reducing the braking effort by the rear brakes, it is necessary to interpose a fluid pressure regulator valve in the common fluid lines to the rear brake cylinders. One typical example of such pressure regulator valve is an inertia valve in which a ball rolls up an inclined ramp when the deceleration reaches a predetermined limit permitting a spring-loaded valve to close whereby the rear brake cylinders are isolated from the common master cylinder. Another example of the known regulator valve is a pressure-proportioning valve using a differential mechanism whereby, when further pressure is applied after the valve closes, some increase in pressure is transmitted to the rear brake cylinders although the larger proportion of the fluid pressure is carried to the front brake cylinders. A third representative example of the regulator valve is one that is known as the pressure-limiting valve, in which, when the fluid pressure transmitted from the master cylinder reaches a pressure corresponding to a predetermined vehicle deceleration, a piston overcomes the force in a compression spring and closes ports leading to the rear brake cylinders; any further increase in pressure is then carried to the front brake cylinders.

If, now, it is desired for the sake of safety driving to have any of these prior art pressure regulator valves combined with the split hydraulic brake system, a problem arises in which only a reduced or limited fluid pressure is transmitted to the rear brake cylinders in the event of a failure in the fluid lines leading to the front brake cylinders.

When any of the fluid lines to the front brake cylinders fails for one reason or another, only the rear brakes are responsible for the braking, with the front brakes inoperable. Since, however, the fluid pressure to be carried to the rear brake cylinders has been reduced by the pressure regulator valve, the rear brakes receive a pressure which is determined merely for the purpose of preventing the rear wheels from being locked when the brake pedal is depressed hard. The braking effort exerted by the rear brakes is, as the consequence, insufficient for the desired deceleration of the vehicle, thus endangering the vehicle occupants.

An object of the invention is therefore to provide an improved hydraulic brake system of tandem type, in which, even though a failure has taken place in any of the fluid lines, the brakes of the remaining fluid lines still remain operable to exert sufficient braking effort thus saving the occupants from a danger of collision.

Another object is to provide an improved split type hydraulic brake system having a fluid pressure regulating or modulating valve whereby, in the event any brake becomes inoperable, the remaining brakes still remain operable to exert a braking effort required for the desired deceleration of the vehicle.

According to a first important feature of the invention to achieve these objects, the split brake system is provided with a fluid pressure modulator valve which is constructed in a manner to pass an unmodulated pressure to the associated brake cylinders when the pressure is lower than a predetermined level and to transmit a modulated or reduced fluid pressure to the brake cylinders when the pressure rises in excess of the predetermined level. When, moreover, a failure takes place in any of the fluid lines, then the valve functions to transmit an unmodulated fluid pressure to the brake cylinders associated with the remaining fluid lines, so that the brakes remaining operable can exert a sufficient braking effort.

According to a second important feature of the invention, the brake system is provided with a fluid pressure modulator valve which, if any of the fluid lines fails, transmits to the associated brake cylinders a fluid pressure modulated at an output-input ratio higher than that available when all the fluid lines are in sound state.

According to a third important feature of the invention, the brake system may be provided with a fluid pressure modulator valve which is constructed to respond not only to changes in the fluid pressure in the fluid lines but to a mechanical linkage movement resulting from an abrupt deceleration of the vehicle whereby the fluid communication between one master cylinder and the associated brake cylinders is blocked when the brake pedal is depressed hard.

Before entering into detailed description of the brake system according to the invention, it should be noted that the brake system is described and shown as divided into two independent fluid circuits connected respectively with front and rear brake units, although the same can be divided into more than two independent fluid circuits especially where the brake system is to be equipped on a motor vehicle having more than four driving wheels.

Figure 1:
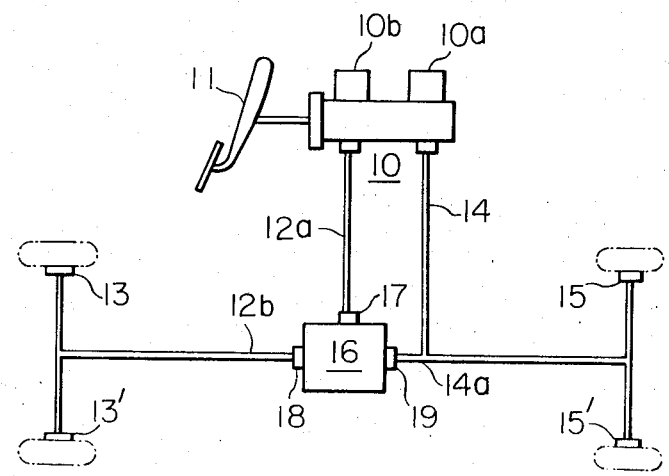
FIG. 1 is a schematic view showing a general arrangement of a hydraulic brake system of split type incorporating the fluid pressure modulator valve proposed by this invention.
Figure 2:
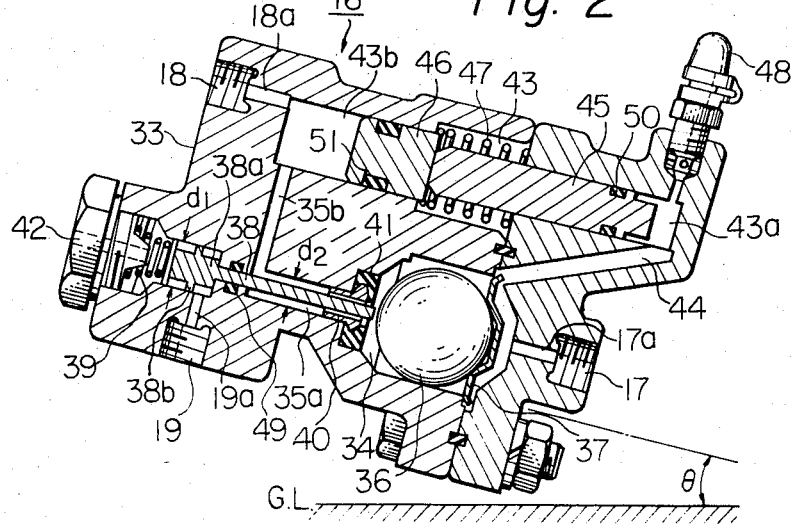
FIG. 2 is a sectional view showing a fluid pressure modulator valve to be incorporated in the brake system according to the invention.

Reference is now made to the accompanying drawings and particularly to FIG. 1. A brake system is illustrated which includes a fluid motor or master cylinder 10 of tandem type having separate front and rear section 10a and 10b, respectively. The first and rear sections 10a and 10b are operated simultaneously by a brake pedal 11 to deliver brake fluid through fluid lines or conduits 12a and 12b to rear brake cylinders 13 and 13' and through a conduit 14 direct to front brake cylinders 15 and 15'. Between the conduits 12a and 12b is interposed a fluid pressure modulator valve 16 through an inlet port 17 and outlet port 18. According to a feature of the invention, the conduit 14 is branched to a branch conduit 14a which, in turn, is led to the modulator valve 16 through an inlet port 19. If preferred, the conduit 14 may be connected to the front brake cylinders 15 and 15' through the valve 16 without using the branch conduit 14a. The detailed construction of a preferred example of the fluid pressure modulator valve 16 is illustrated in section in FIG. 2.

As illustrated, the fluid pressure modulator valve 16 includes a housing 33 of cast metal. The housing 33 has formed therein a bore or chamber 34 communicating with an inlet port 17 through a passage 17a and with an outlet port 18 through passages 35a, 35b and 18a. The inlet and outlet ports 17 and 18 communicate with the rear brake master cylinder 10b and rear brake cylinders 13 and 13', respectively, similar to the valve 16 shown in FIG. 2. In the bore or chamber 34 is accommodated a ball member 36 which is supported by a receiver plate 37 secured to the housing 33. The ball member 36 rests on a ramp which forms part of the wall of the chamber 34 and which is inclined at an angle of $\theta$ to the horizontal or ground line G.L. A control element 38 is provided behind the passage 19a from an inlet port 19 communicating with the front brake master cylinder 10a. The control element 38 on one hand extends axially movably into the passage 35a and has on the other an enlarged portion 38a acting as a stop to restrict the axial movement of the control element 38 toward the chamber 34. The control element 38 is moved back and forth by the fluid pressure applied to an annular projection 38b formed on the enlarged portion 38a. The control element 38 is normally forced into its protruded position by the compression of a compression spring 39 mounted behind the enlarged portion 38a of the control element 38, whereby the leading end of the control element 38 projects into the chamber 34 as illustrated. At the inlet to the passage 35a are mounted an orifice 40 to regulate the flow of fluid therethrough and a ball seal member 41 which is lined on the wall of the chamber 34. The chamber to accommodate the spring 39 is hermetically isolated from the chamber to accommodate the enlarged portion 38a of the control element 38 and is opened into the air through an air vent 42.

The compression of the spring 39 and the relative outside diameter $d_1$ of the annular projection 38 are so determined that the spring 39 overpowers a fluid pressure applied to the enlarged portion 38a when the pressure is lower than a predetermined level.

The housing 33 also has formed therein a second bore or chamber 43 which communicates with the first chamber 34 through a chamber 43a and a passage 44 and with the outlet port 18 through a chamber 43b and passage 18a. The chambers 43a and 43b form part of the chamber 43.

The chamber 43 has accommodated therein two separate pistons 45 and 46 which are held in contact with each other by the pressures of the fluids. One piston 45 is exposed to a fluid transmitted from the rear brake master cylinder 10b through the passage 44 and chamber 43a, and the other piston 46 to a fluid staying in the chamber 43b. The piston 46 is forced toward the chamber 43b by the action of a compression spring 47 mounted in the chamber 43. The piston 45 is herein shown as smaller in diameter than the piston 46.

In order that air entrapped in the fluid in the passages 35b and 44, be allowed into the atmosphere, air bleeds may be provided anywhere therein, although only an air bleed 48 is herein illustrated. Designated by numerals 49 to 51 are rubber seals.

Figure 3:
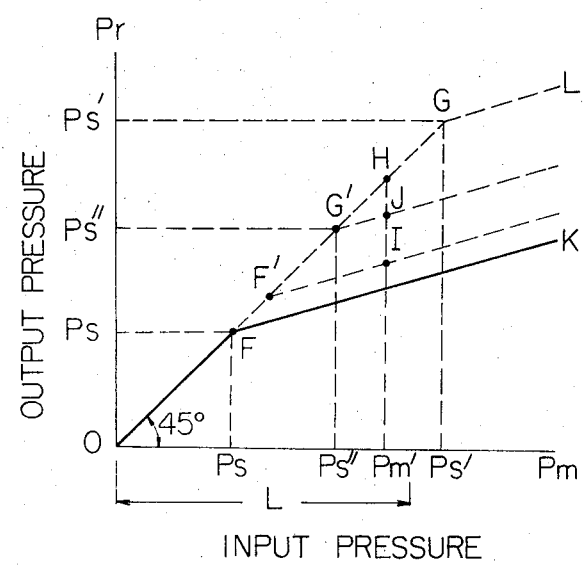
FIG. 3 is a graphical representation showing the relations between the input and output fluid pressures attainable in the modulator valve shown in FIG. 2.

When, now, the brake pedal is depressed with the fluid circuits all normally operable and with the control element 38 held in a position to have its leading end projecting into the chamber 34, the passage 35a is kept open to permit the fluid pressure in the chamber 43 to be transmitted to the outlet port 18 directly. As a result, the pressure to be carried to the rear brake cylinders increase as indicated by a solid line AF in FIG. 3.

As the brake pedal is further depressed and the fluid pressure Pm applied to the control element 38 through the inlet port 19 is increased to a level that is slightly lower than a predetermined fluid pressure Ps, the control element 38 is moved against the action of the spring 39 and the leading end thereof is withdrawn from the chamber 34. Once the fluid pressure Pm reaches Ps and te deceleration increases accordingly, then the ball member 36 rolls up the inclined ramp or wall of the chamber 34 and is brought into contact with the ball seat 41 due to a force of inertia, isolating the passage 35a from the chamber 34. As the consequence, the input pressure Pm occurring in the chamber 34 is transmitted to the piston 45 through the passage 44 and chamber 43a.

When the fluid pressure Pm rises in excess of Ps, then the output pressure occurring in the outlet port 18 increases at a rate which is dictated by the outside diameters of the pistons 45 and 46 and the compression of the spring 47, as indicated by a solid line FK. Thus, a constantly reduced fluid pressure is transmitted to the rear brake cylinders to prevent the rear driving wheels from being locked objectionably.

If, in an existing inertia valve which is void of the control element 38 and its associated parts, a failure takes place in the fluid circuit to the front brake unit so that only the rear brake fluid circuit is left operable, the actuating point of the inertia valve is shifted from the point F to a point F' whereby the output pressure Pr to be carried to the rear brake cylinders is increased as indicated by a dotted line F'I. The output pressure thus reduced is apparently insufficient for the proper operation of the rear brakes, creating a danger to the vehicle occupants.

In the modified fluid pressure modulator valve 16', in contrast, the control element 38 is freed of the fluid pressure as soon as the front brake fluid circuit fails and, thereafter, the leading end of the control element 38 remains projecting into the chamber 34 past the ball seat 41. If, therefore, the compression of the spring 39, diameter $d_2$ of the leading end of the control element 38 and weight of the ball member 36 are properly determined, a fluid pressure $Ps'$ at which the ball member 36 is moved to close the passage 35a may be determined at a point outside a certain pressure range (which is indicated by L in FIG. 3) so that the valve 16' as a whole can act merely as a passageway when the input pressure Pm remains within this particular range. In this instance, the output pressure to be transmitted to the rear brake cylinders will increase as indicated by a dotted line FG and, if an input pressure $Pm'$ falling within the range L is transmitted to the inlet port 17, the braking effort by the rear brakes will increase by an amount corresponding to a segment HI in FIG. 3 as compared with a conventional inertia valve.

If, furthermore, the compression of the spring 39, diameter $d_2$ of the leading end of the control element 38, weight of the ball member 36 are determined otherwise, the ball member 36 may be moved when the fluid pressure reaches $Ps''$ which falls within the range L. The output pressure, in this instance, will increase as indicated by a dotted line $FG'J$ with an increment of HJ at the input pressure $Pm'$.

In any event, the output pressure to be exerted to the rear brake cylinders after the passage 35a is closed by the ball member 36 increases at one and the same rate that is governed by the diameters of the pistons 45 and 46 and the compression of the spring 47, as previously discussed.

What is claimed is:

1. In a vehicular hydraulic brake system comprising a tandem master cylinder having front and rear sections respectively connected through two independent fluid circuits with front and rear brake cylinders for respectively effecting braking in frotn and rear wheels of a vehicle, a fluid pressure modulator valve provided intermediately of one of said fluid circuits, comprising: a first inlet port communicating with one of the front and rear sections and with one of the brake cylinders for providing constant fluid communication therebetween; a second inlet port communicating with the other of the front and rear sections; an outlet port communicating with the other of said brake cylinders; a chamber for providing fluid communication between said second inlet port and said outlet port to pass an unmodulated fluid pressure from said second inlet port to said outlet port; and means responsive to a force of inertia resulting from a deceleration of the vehicle with a predetermined magnitude for blocking said fluid communication between said second inlet port and said outlet port, and responsive to a failure in said fluid circuit with front brake cylinder for transmitting an unmodulated fluid pressure from said second inlet port to said outlet port.

2. A fluid pressure modulator valve according to claim 1, wherein said means comprises a ball member accommodated in said chamber and resting on a ramp which is inclined at an angle to a horizontal line, a ball seat secured to an outlet portion of said chamber to said outlet port and positioned relative to said ball member, the weight of said ball member being determined so that the ball member is responsive to a predetermined deceleration of the vehicle to roll up said ramp and seat on said ball seat for blocking the fluid communication between said chamber and said outlet port, a control member having a leading end extending toward said ball member through said outlet portion and an enlarged portion slidably mounted in a bore leading from said first inlet port and having formed on its peripheral wall an annular projection, a compression spring mounted behind said enlarged portion to force the enlarged portion to a position in which said leading end projects into said chamber past said ball seat, the compression of said spring and the relative diameter of said annular projection being determined to cause said spring to yield to a fluid pressure applied to said enlarged portion through said first inlet port for causing the enlarged portion to be moved to a position in which the leading end of said control element in withdrawn from said chamber when the fluid pressure in said first inlet port is higher than a predetermined level, a second chamber formed in said housing and communicating on one side with the first named chamber and on the other with said outlet port, two individual pistons slidably mounted in said second chamber and held in contact with each other, one piston of which is exposed to the fluid pressure in said second inlet port and the other to the fluid pressure in said outlet port, the former being larger in diameter than the latter, and a compression spring mounted in said second chamber to force the latter piston toward said outlet port.

* * * * *